US012676270B2

(12) United States Patent
Zeng et al.

(10) Patent No.: US 12,676,270 B2
(45) Date of Patent: Jul. 7, 2026

(54) ROCKER DEVICE AND CONTROLLER

(71) Applicant: GUANGDONG K-SILVER INDUSTRIAL CO., LTD., Shenzhen (CN)

(72) Inventors: Xiao Zeng, Shenzhen (CN); Jianbo Zhao, Shenzhen (CN)

(73) Assignee: GUANGDONG K-SILVER INDUSTRIAL CO., LTD., Shenzhen (CN)

( * ) Notice: Subject to any disclaimer, the term of this patent is extended or adjusted under 35 U.S.C. 154(b) by 246 days.

(21) Appl. No.: 18/410,265

(22) Filed: Jan. 11, 2024

(65) Prior Publication Data

US 2025/0125108 A1 Apr. 17, 2025

(30) Foreign Application Priority Data

Oct. 13, 2023 (CN) ......................... 202322760416.0

(51) Int. Cl.
*H01H 23/08* (2006.01)
*H01H 23/00* (2006.01)

(52) U.S. Cl.
CPC .......... *H01H 23/08* (2013.01); *H01H 23/006* (2013.01); *H01H 2223/012* (2013.01); *H01H 2223/028* (2013.01)

(58) Field of Classification Search
CPC .... H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26; G05G 9/047; G05G 5/05; G05G 2009/04711; G05G 2009/04744; G05G 2009/04718; G05G 2009/04751; G05G 2009/04777; G05G 2009/04725; G05G 2009/04748; G05G 2009/04762; G05G 2009/04766
See application file for complete search history.

(56) References Cited

U.S. PATENT DOCUMENTS

2023/0324945 A1* 10/2023 Zeng ...................... G05G 9/047

* cited by examiner

*Primary Examiner* — Ahmed M Saeed
(74) *Attorney, Agent, or Firm* — Westbridge IP LLC

(57) ABSTRACT

Disclosed are a rocker device and a controller. The rocker device includes a mounting base and a rocker assembly, the mounting base is provided with a first accommodating cavity with an opening, the mounting base is configured to connect with the controller, the rocker assembly is provided in the first accommodating cavity and snapped with the mounting base, the rocker assembly is configured to electrically connect with the controller to achieve multi-directional control.

8 Claims, 3 Drawing Sheets

ROCKER DEVICE AND CONTROLLER

CROSS-REFERENCE TO RELATED APPLICATIONS

This application claims priority to Chinese Patent Application No. 202322760416.0, filed on Oct. 13, 2023, the content of which is incorporated herein by reference in its entirety.

TECHNICAL FIELD

The present application relates to the technical field of remote control, in particular to a rocker device and a controller.

BACKGROUND

As an input device, the rocker device is usually configured for operating handle of unmanned aerial vehicle, gamepad, etc. The rocker device mainly includes a rocker and two swing arm parts. Turning the rocker to drive the swing arm parts to operate and enable the potential regulation module on the electronic control board to output a specific resistance or voltage. During the operation of the rocker device, the rocker usually swings in different directions to represent different commands.

Because the rocker of the rocker device needs to keep shaking during use, it is relatively easy to be damaged, and it is often necessary to replace the rocker with a new one. However, since the existing rocker device and the controller PCB board generally adopt welding connection method, which is not easy to disassemble and assemble, making it inconvenient for users to replace the new rocker device by themselves.

SUMMARY

The main purpose of the present application is to provide a rocker device, which is applied to a controller and is intended to realize quick disassembly and assembly between the rocker device and the controller.

In order to achieve the above purpose, the present application proposes a rocker device, the rocker device includes a mounting base and a rocker assembly, the mounting base is provided with a first accommodating cavity with an opening, the mounting base is configured to connect with the controller; and the rocker assembly is provided in the first accommodating cavity and snapped with the mounting base, and the rocker assembly is configured to electrically connect with the controller to achieve multi-directional control.

In an embodiment of the present application, first slots are provided on two opposite cavity walls of the first accommodating cavity, snap plates are provided on two opposite outer peripheral walls of the rocker assembly, a first snap is protruding from the snap plate, and the first snap is snap-fitted in the first slot.

In an embodiment of the present application, each cavity wall is provided with two first slots, each snap plate is provided with two first snaps, and one of the two first snaps is snap-fitted in one of the two first slots.

In an embodiment of the present application, one end of the snap plate is connected to the rocker assembly, another end of the snap plate is a movable end, the movable end of the snap plate is provided with a pressing portion, and the pressing portion is configured to be pressed to disengage the first snap from the first slot.

In an embodiment of the present application, a guiding portion is protruding from a cavity wall of the accommodating cavity, and the guiding portion is provided along a vertical direction; and an outer peripheral wall of the rocker assembly is provided with a guiding groove, the guiding groove is provided along the vertical direction, and the guide portion is slidably provided in the guiding groove.

In an embodiment of the present application, the rocker assembly includes an upper cover, a base and a rocker structure, the upper cover and the base are detachably connected and enclosed to form a second accommodating cavity with an opening, and the rocker structure is provided in the second accommodating cavity and is partially exposed at the opening.

In an embodiment of the present application, second snaps are protruding from two opposite sides of the upper cover, second slots are provided on two opposite sides of the base, and one of the second snaps is engaged in one of the second slots.

In an embodiment of the present application, through holes are provided on another two opposite sides of the upper cover, one end of a connecting piece is connected to another two opposite sides of the base, and another end of the connecting piece passes through and is stuck in the through hole to connect the upper cover and the base.

The present application further proposes a controller including the rocker device as described above.

In an embodiment of the present application, a plurality of spring pins are provided on a circuit board of the controller, a plurality of contacts are provided on a circuit board of the rocker assembly, and the mounting base and the rocker assembly are provided with a plurality of avoidance holes to make the plurality of the spring pins abut against and electrically connected to the plurality of the contacts.

The rocker device proposed in the technical solution of the present application includes a rocker assembly and a mounting base, the mounting base is connected to the controller, the rocker assembly is electrically connected with the controller to achieve multi-directional control, between the rocker assembly and the mounting base adopt a snapping connection method, when the rocker assembly is damaged or needs to be replaced, just remove the old rocker assembly from the mounting base and replace the old rocker assembly with the new rocker assembly, the snapping connection method makes assembly and disassembly faster and more convenient, saving the time cost of replacing the rocker assembly, and improving efficiency.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those of ordinary skill in the art.

The realization of the purpose, functional features and advantages of the present application will be further described in conjunction with the embodiments and with reference to the accompanying drawings.

DETAILED DESCRIPTION OF THE EMBODIMENTS

The technical solutions in the embodiments according to the present application will be clearly and completely described below in conjunction with the accompanying drawings in the embodiments according to the present application, and it is clear that the described embodiments are only a part of the embodiments according to the present application, and not all of the embodiments. Based on the embodiments in this application, all other embodiments obtained by a person of ordinary skill in the art without making creative labor fall within the scope of this application.

It should be noted that in the embodiment of the present application, all directional indications (such as up, down, left, right, front, back or the like) are only used to explain the relative positional relationship, movement and so on between various components in a specific posture (as shown in the accompanying drawings). If the specific posture changes, the directional indication will also change accordingly.

In addition, if there are descriptions involving "first", "second" or the like, the descriptions of "first", "second" or the like are only for descriptive purposes and cannot be understood as indicating or implying the relative importance or implicitly indicating the quantity of the technical features indicated. Therefore, features defined as "first" and "second" may explicitly or implicitly include at least one of these features. In addition, the technical solutions of various embodiments can be combined with each other, but it must be based on that those of ordinary skill in the art can realize. When the combination of technical solutions is contradictory or cannot be realized, it should be considered that such combination of technical solutions does not exist and is not within the protection scope claimed by the present application.

Because the rocker of the rocker device needs to keep shaking during use, it is relatively easy to be damaged, and it is often necessary to replace the rocker with a new one. However, since the existing rocker device and the controller PCB board generally adopt welding connection method, which is not easy to disassemble and assemble, making it inconvenient for users to replace the new rocker device by themselves. Therefore, the present application proposes a rocker device that can be quickly disassembled and assembled from the controller.

The present application proposes a rocker device 100.

Figure 1:
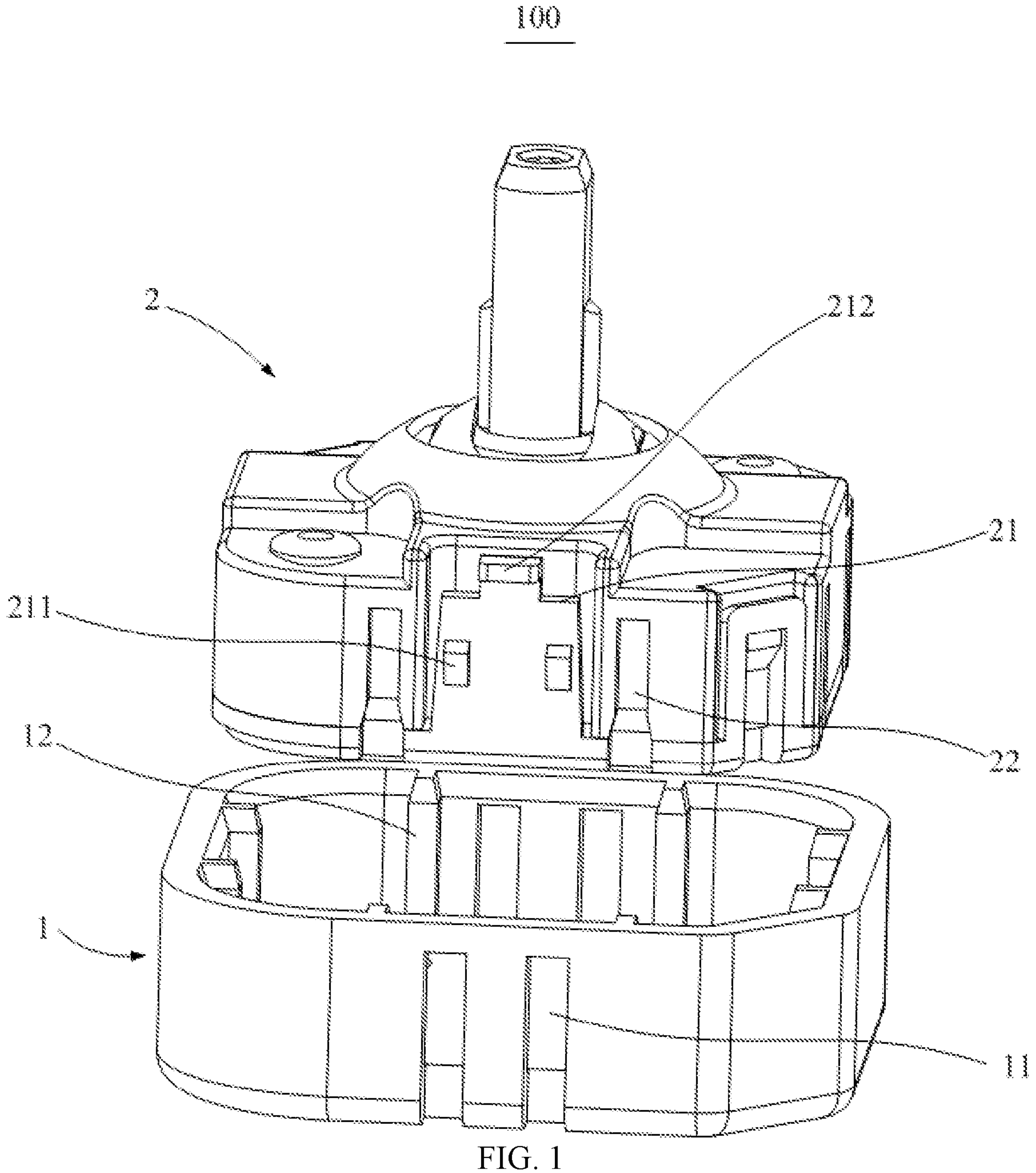
FIG. 1 is a structural schematic view of a rocker device according to an embodiment of the present application.
Figure 2:
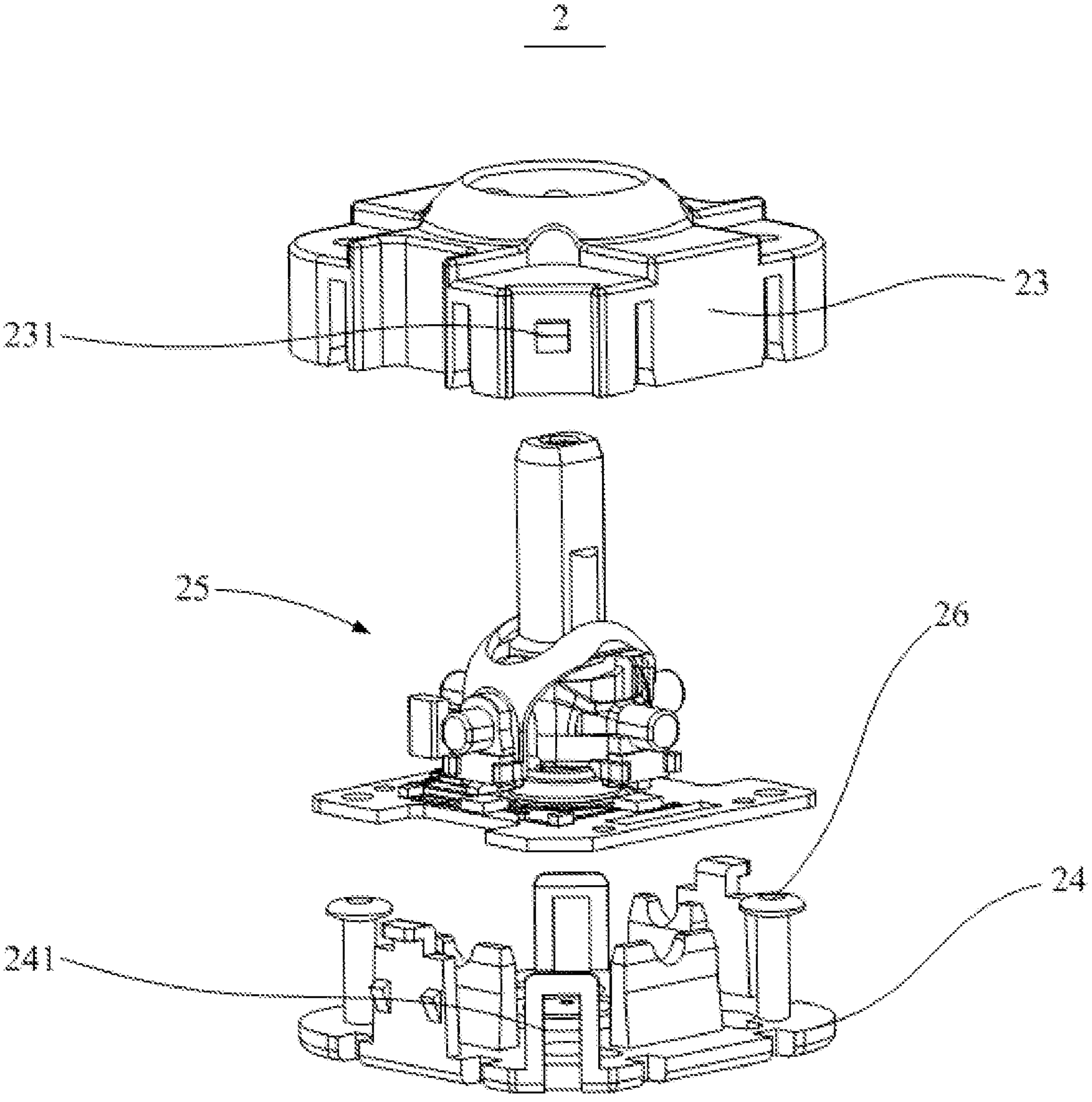
FIG. 2 is a structural schematic view of a rocker device according to another embodiment of the present application.
Figure 3:
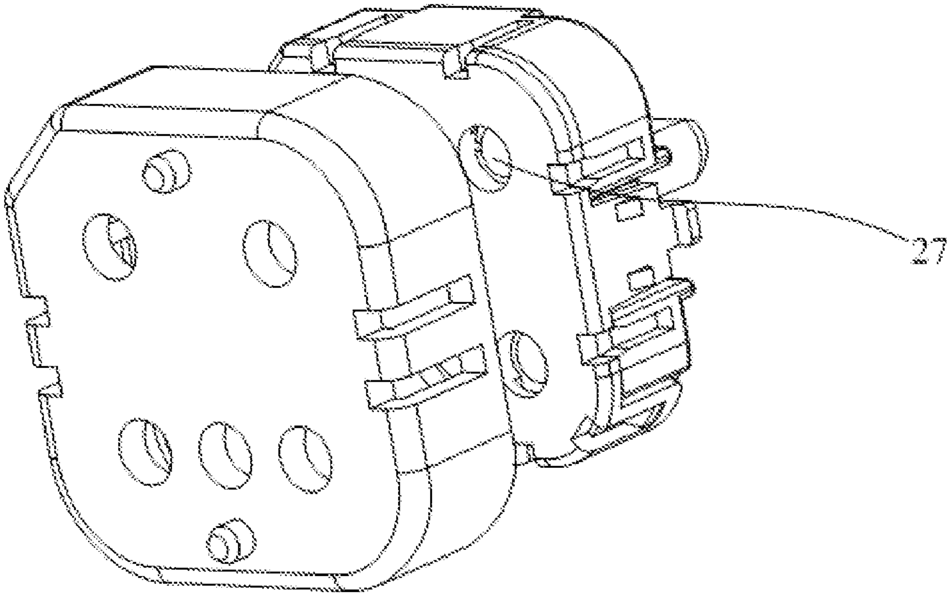
FIG. 3 is a structural schematic view of a rocker device according to yet another embodiment of the present application.

In an embodiment of the present application, with reference to FIG. 1 to FIG. 3, the rocker device 100 includes a mounting base 1 and a rocker assembly 2, the mounting base 1 is provided with a first accommodating cavity with an opening, and the mounting base 1 is configured to connect with the controller; the rocker assembly 2 is provided in the first accommodating cavity and snapped with the mounting base 1, and the rocker assembly 2 is configured to electrically connect with the controller to achieve multi-directional control.

The rocker device 100 proposed in the technical solution of the present application includes a rocker assembly 2 and a mounting base 1, the mounting base 1 is connected to the controller, the rocker assembly 2 is electrically connected with the controller to achieve multi-directional control, between the rocker assembly 2 and the mounting base 1 adopt a snapping connection method, when the rocker assembly 2 is damaged or needs to be replaced, just remove the old rocker assembly 2 from the mounting base 1 and replace the old rocker assembly 2 with the new rocker assembly 2, the snapping connection method makes assembly and disassembly faster and more convenient, saving the time cost of replacing the rocker assembly 2, and improving efficiency.

Please refer to FIG. 1, in an embodiment of the present application, first slots 11 are provided on two opposite cavity walls of the first accommodating cavity, snap plates 21 are provided on two opposite outer peripheral walls of the rocker assembly 2, a first snap 211 is protruding from the snap plate 21, and the first snap 211 is snap-fitted in the first slot 11.

In this embodiment, the first slots 11 are provided on two opposite cavity walls of the first accommodating cavity, correspondingly, the snap plates 21 are provided on two opposite outer peripheral walls of the rocker assembly 2, the first snap 211 is protruding from the snap plate 21, and the first snap 211 is snap-fitted in the first slot 11 to assemble the rocker assembly 2 and the mounting base 1 together, the snap connection facilitates disassembly and assembly and improves efficiency.

Please refer to FIG. 1 again, in an embodiment of the present application, each cavity wall is provided with two first slots 11, each snap plate 21 is provided with two first snaps 211, and one of the two first snaps 211 is snap-fitted in one of the two first slots 11.

In this embodiment, two first slots 11 are provided on each cavity wall, correspondingly, two first snaps 211 are provided at intervals on each snap plate 21, each first snap 211 is snap-fitted in one of the two first slots 11 to improve the connection strength between the mounting base 1 and the rocker assembly 2.

In an embodiment of the present application, as shown in FIG. 1, one end of the snap plate 21 is connected to the rocker assembly 2, another end of the snap plate 21 is a movable end, the movable end of the snap plate 21 is provided with a pressing portion 212, and the pressing portion 212 is configured to be pressed to disengage the first snap 211 from the first slot 11.

In this embodiment, one end of the snap plate 21 is fixed or integrally formed with the rocker assembly 2, another end of the snap plate 21 is a movable end that can bounce toward the inside of the first accommodating cavity, the movable end of the snap plate 21 is provided with the pressing portion 212, and pressing the pressing portion 212 can make the snap plate 21 bend into the first accommodating cavity, and then the first snap 211 is separated from the first slot 11, thus realizing quick disassembly between the rocker assembly 2 and the mounting base 1.

In an embodiment of the present application, as shown in FIG. 1, a guiding portion 12 is protruding from a cavity wall of the accommodating cavity, and the guiding portion 12 is provided along a vertical direction; and an outer peripheral wall of the rocker assembly 2 is provided with a guiding groove 22, the guiding groove 22 is provided along the vertical direction, and the guide portion 12 is slidably provided in the guiding groove 22.

In this embodiment, the guiding portion 12 is protruding from the cavity wall of the first accommodating cavity, each cavity wall is provided with two guiding portions 12, the guiding portion 12 is provided along the vertical direction, correspondingly, the outer peripheral wall of the rocker assembly 2 is provided with a guiding groove 22, the guiding portion 12 can slide along the guiding groove 22 and can guide the rocker assembly 2 to be installed in the mounting base 1, thereby improving the installation efficiency.

In an embodiment of the present application, with reference to FIG. 2, the rocker assembly 2 includes an upper cover 23, a base 24 and a rocker structure 25, the upper cover 23 and the base 24 are detachably connected and enclosed to form a second accommodating cavity with an opening, and the rocker structure 25 is provided in the second accommodating cavity and is partially exposed at the opening.

In this embodiment, the rocker assembly 2 includes the detachably connected upper cover 23 and base 24, the second accommodating cavity with the opening is enclosed between the upper cover 23 and the base 24, the rocker structure 25 is provided in the second accommodating cavity to protect the circuit board and other components in the rocker structure 25, and the rocker structure 25 is partially exposed at the opening of the second accommodation cavity, the upper cover 23 and the base 24 are detachably connected, thus can realize easy disassembly between the upper cover 23 and the base 24 and improve the efficiency of assembly and disassembly.

In an embodiment of the present application, as shown in FIG. 2, second snaps 231 are protruding from two opposite sides of the upper cover 23, second slots 241 are provided on two opposite sides of the base 24, and one of the second snaps 231 is engaged in one of the second slots 241.

In this embodiment, the second snaps 231 are protruding from two opposite sides of the upper cover 23, correspondingly, the second slots 241 are provided on two opposite sides of the base 24, the second snap 231 is snap-fitted in the second slot 241 to make the upper cover 23 snap with the base 24, thus improving the efficiency of assembly and disassembly.

Please refer to FIG. 2, in an embodiment of the present application, through holes are provided on another two opposite sides of the upper cover 23, one end of a connecting piece 26 is connected to another two opposite sides of the base 24, and another end of the connecting piece 26 passes through and is stuck in the through hole to connect the upper cover 23 and the base 24.

In this embodiment, the through holes are provided on another two opposite sides of the upper cover 23, one end of the connecting piece 26 is connected to another two opposite sides of the base 24, the connecting piece 26 can be integrally formed with the base 24, or can be separated from the base 24 and connected as a whole through gluing or other methods, which is not further limited here. Another end of the connecting piece 26 passes through the through hole, and another end of the connecting piece 26 is stuck on another side of the through hole by riveting, bending or other methods, thereby realizing the connection between the upper cover 23 and the base 24, and improving the connection strength between the upper cover 23 and the base 24. It can be understood that in other embodiments, the corresponding position of the base 24 is provided with a connecting hole, the connecting piece 26 adopts screw, which passes through the through hole and are screwed and fixed into the connecting hole to fix the upper cover 23 and the base 24 together.

The present application further proposes a controller (not shown in figure). The controller includes a rocker device 100, and the specific structure of the rocker device 100 refers to the above embodiment. Since the controller adopts all the technical solutions of all the above embodiments, it has at least all the beneficial effects brought by the technical solutions of the above embodiments, which will not be described again here.

Please refer to FIG. 2, in an embodiment of the present application, a plurality of spring pins (not shown in figure) are provided on a circuit board of the controller, a plurality of contacts 27 are provided on a circuit board of the rocker assembly 2, and the mounting base 1 and the rocker assembly 2 are provided with a plurality of avoidance holes to make the plurality of the spring pins abut against and electrically connected to the plurality of the contacts 27.

In this embodiment, a plurality of spring pins are provided on the circuit board of the controller, a plurality of corresponding contacts 27 are provided on the circuit board of the rocker assembly 2, and the corresponding positions of the rocker assembly 2 and the mounting base 1 are provided with avoidance hole to make the spring pin abut against and electrically connected to the contact 27, thereby realizing the electrical connection between the controller and the rocker device 100, reducing wire connections, making it easier to disassemble and assemble, and improving efficiency.

The above are only some embodiments of the present application, and are not intended to limit the scope of the present application. Under the concept of the present application, any equivalent structure transformation made by using the description and accompanying drawings of the present application, or directly or indirectly applied in other related technical fields, is included within the scope of the present application.

What is claimed is:

1. A rocker device applied to a controller, comprising:

a mounting base provided with a first accommodating cavity with an opening, wherein the mounting base is configured to connect with the controller; and a rocker assembly provided in the first accommodating cavity and snapped with the mounting base, wherein the rocker assembly is configured to electrically connect with the controller to achieve multi-directional control;

wherein first slots are provided on two opposite cavity walls of the first accommodating cavity, snap plates are provided on two opposite outer peripheral walls of the rocker assembly, a first snap is protruding from the snap plate, and the first snap is snap-fitted in the first slot.

2. The rocker device according to claim 1, wherein each cavity wall is provided with two first slots, each snap plate is provided with two first snaps, and one of the two first snaps is snap-fitted in one of the two first slots.

3. The rocker device according to claim 2, wherein one end of the snap plate is connected to the rocker assembly, another end of the snap plate is a movable end, the movable end of the snap plate is provided with a pressing portion, and the pressing portion is configured to be pressed to disengage the first snap from the first slot.

4. The rocker device according to claim 1, wherein a guiding portion is protruding from a cavity wall of the accommodating cavity, and the guiding portion is provided along a vertical direction; and an outer peripheral wall of the rocker assembly is provided with a guiding groove, the guiding groove is provided along the vertical direction, and the guide portion is slidably provided in the guiding groove.

5. The rocker device according to claim 1, wherein the rocker assembly comprises an upper cover, a base and a rocker structure, the upper cover and the base are detachably connected and enclosed to form a second accommodating cavity with an opening, and the rocker structure is provided in the second accommodating cavity and is partially exposed at the opening.

6. The rocker device according to claim 5, wherein second snaps are protruding from two opposite sides of the upper cover, second slots are provided on two opposite sides of the base, and one of the second snaps is engaged in one of the second slots.

7. The rocker device according to claim 6, wherein through holes are provided on another two opposite sides of the upper cover, one end of a connecting piece is connected to another two opposite sides of the base, and another end of the connecting piece passes through and is stuck in the through hole to connect the upper cover and the base.

8. A controller comprising the rocker device according to claim 1.

* * * * *